Aug. 16, 1927.  
W. T. HENSLEY  
PROCESS OF MAKING PULLEYS  
Filed Dec. 17, 1923

Inventor  
Wm T. Hensley  
Lloyd L. Evans

Attorney

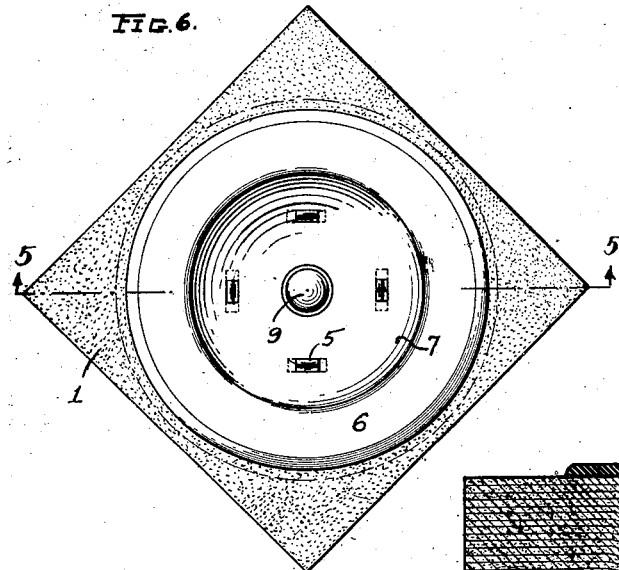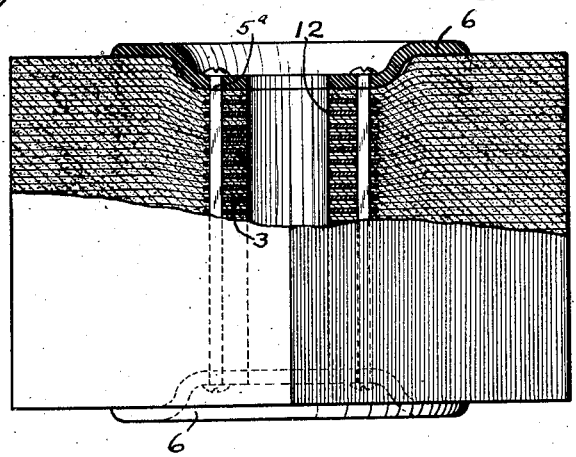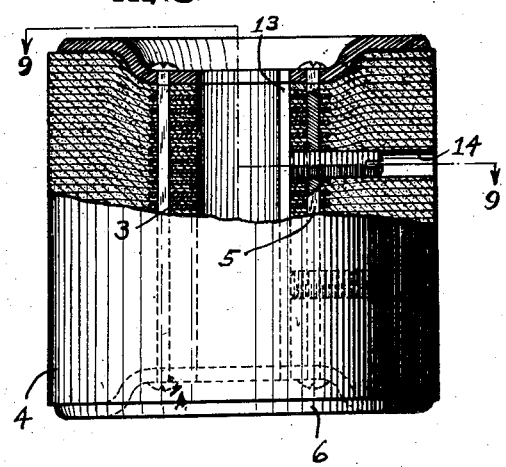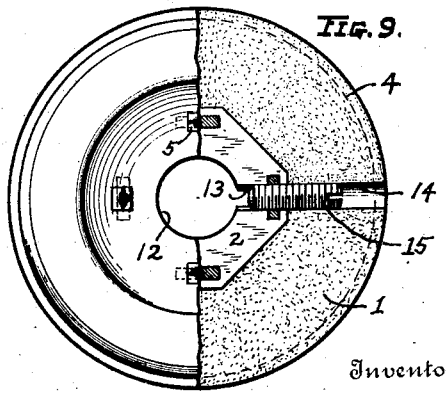

Patented Aug. 16, 1927.

1,639,501

UNITED STATES PATENT OFFICE.

WILLIAM T. HENSLEY, OF INDIANAPOLIS, INDIANA.

PROCESS OF MAKING PULLEYS.

Application filed December 17, 1923. Serial No. 681,154.

This invention relates to the manufacture of pulleys and more particularly to those constructed from plates of fibrous material, such as layers of strawboard or other fibrous material, alternating with layers or plates of relatively harder material.

An object of the invention is to provide a method of assembling and securing the various pulley laminæ together, and finish10 ing them to form a complete pulley of a commercial type.

Another object of the invention is to provide a method of clamping the inner portion of fibrous laminæ and compressing them sufficiently to substantially increase their density near the center, thereby forming a relatively hard, dense core portion, leaving the outer portion relatively soft and having a maximum frictional surface.

It is also an object to provide an improved method of manufacture whereby pulleys of this kind may be made in a simple, efficient and practical manner and at a relatively low cost.

This application is directed to the method of making pulleys as set forth in my prior application Serial No. 610,175, filed January 2, 1923.

These and other objects will be apparent from the following description and annexed drawings, in which Figure 1 is a view showing the face and edge of a pair of the fibrous laminæ perforated and ready to be assembled.

Fig. 2 is a similar view of one of the metal plates.

Figure 5:
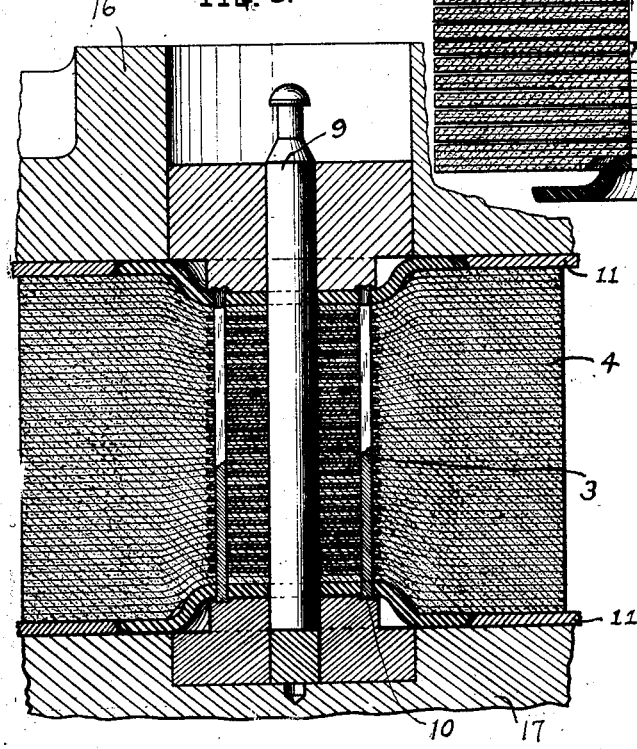

Fig. 5 is a sectional view on line 5—5, Fig. 6 showing the pulley compressed and the rivet heads spread.

Fig. 6 is a plan view of the pulley shown in Fig. 5.

Fig. 7 is a view, partly in section, of a pulley with the center hole bored.

Fig. 8 is a similar view of a pulley with the outside trimmed down, and the set screws in place, and keyway cut.

Fig. 9 is an end view, partly in section of Fig. 8.

As shown in the drawings, the pulley comprises a plurality of laminæ 1 of strawboard or other fibrous material alternating with relatively hard plates 2, preferably of metal, so that when the fibrous layers have been clamped and compressed between the plates, the center 3 of the pulley will be more dense than the outer portion 4 of the pulley. The center of the pulley is, therefore, well adapted to be directly keyed to the shaft to be driven thereby, or to drive the same while the outer surface of the laminated material is relatively soft, and furnishes a maximum frictional surface for engagement with the belt or other driving or driven means.

The laminæ of the pulley may consist of any suitable fibrous material, such as strawboard or the like, which are secured together and positively held by rivets, preferably flat bars 5, as more fully described hereinafter.

Figure 1:
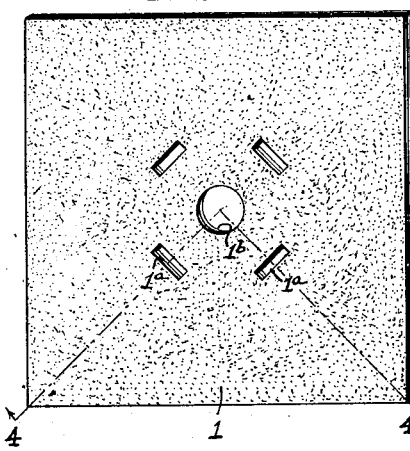
Figure 2:
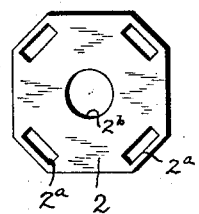
Figure 3:
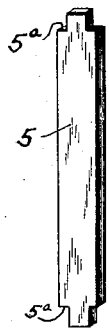
Fig. 3 is a similar view of one of the rivets.

In the manufacture of my pulleys, fibrous units, such as shown in Fig. 1, and sheet metal units, as shown in Fig. 2, are fabricated in any suitable manner and are preferably of polygonal shape, as the fibrous units are cut from strips or sheets and the metal plates are preferably noncircular so that they will have no tendency to move relative to the fibrous material. The units, when fabricated, may be assembled concentrically on a supporting device, such as an arbor, by means of their center perforations $1^b$, $2^b$. One good means for so fabricating these units and assembling them upon an arbor is shown in my application Serial No. 655,690, filed September 29, 1923. It is to be understood, however, that such blanks may be formed by any suitable means from strips or sheets of strawboard, or other fibrous material, and metal, and may be assembled in any desired manner upon the receiving arbor.

If it is desired to apply an adhesive binder to the fibrous laminæ, this is done while the stock materials are being fabricated into laminæ, or while the layers are assembled on the arbor. Any suitable liquid binder, such as casein glue or sodium silicate, may be used. Also, it is obvious of course that the fibrous and metal blanks must be perforated, as at $1^a$ and $2^a$, to receive the metal rivet bars and may be assembled on the arbor with the perforations of each layer registering with and alining with the remainder, so that the rivet bars may be passed into the assembly.

While I have shown in the drawing blanks having perforations to receive four rivet bars, any desired number of rivet bars may be used, but they should be symmetrically arranged, so that a balanced pulley will be produced. It is preferable to insert part of the rivets through one end of the assembly and part through the other, as the assembly before being pressed has a greater width of face than the length of the rivets, and, by so placing the rivets, the laminæ will be properly held in alinement for pressing. The apertures to receive the rivets are preferably just large enough so that the rivets may be readily inserted but there is sufficient friction to hold them where desired, so that those inserted from the top will not drop to the bottom. Before the assembly is compressed, the end plates 6 are placed at each end and, if end plates are used which have relatively deep depressions 7 therein, it is preferable to use some annular laminæ 8 as fillers to compensate for the depression.

After the assembly is completed, it is inserted in a press, the upper and lower members 16 and 17 of which are indicated in Fig. 5, and the pulley is pressed with a relatively great pressure, such for example as 4 or more tons per square inch of surface. The inner portion of the fibrous laminæ which are clamped between the hard or metal plates of less radial dimension are compressed until the density of the fibrous material is substantially increased, thus forming a relatively hard, dense, central portion serving as a core, but which is integrally attached to the fibrous material.

The outer portion of the pulley is pressed only sufficiently by the annular members 11 carried by the press to give the fibrous laminæ a permanent set in a position substantially at right angles to the axis of the pulley. This prevents any tendency for them to flare outwardly and thus be more easily separated from the adjacent laminæ and bent over and broken in service. Preferably, the outer portion of the pulley is not pressed sufficiently to materially increase its density, so that it will present a relatively soft, frictional surface for power transmission.

Figure 4:
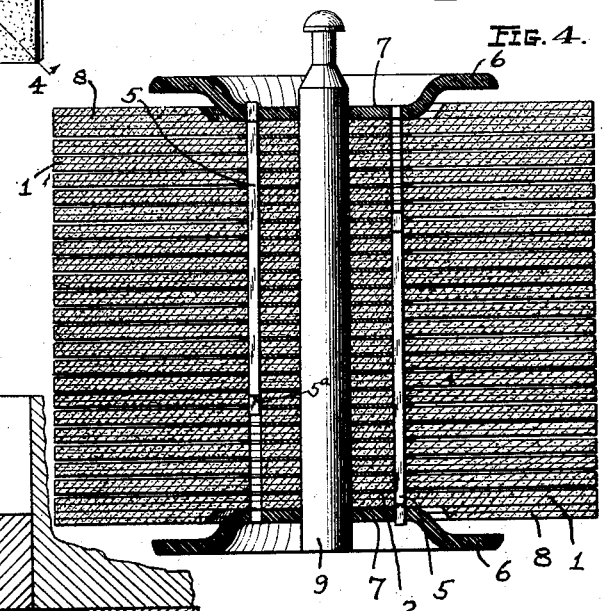
Fig. 4 is a sectional view of a complete pile of laminæ with end plates and rivets, the view being taken on a line corresponding to line 4—4, Fig. 1 to show the rivets inserted from each end, the section being rotated to the same plane.

It may be noted that the metal plates may be either partially or wholly pressed in the surface of the fibrous material during the formation of the units before they are assembled, or they may be assembled as shown in Fig. 4 and the compression of the fibrous material be accomplished in the press.

It will also be noted that since the apertures in the metal plates are of polygonal shape and the rivets are similarly shaped to engage them, and also that the end plates are rigidly held to the rivets by the shoulders and the spreading of the heads of the rivets, that a skeleton frame is produced which has considerable strength in itself even in the absence of the fibrous material, which, of course, strengthens the construction.

The shoulders 5ª of the rivets act as limits for the end plates 6 which are apertured to receive only the reduced ends of the rivets. By this means it is possible to simply carry the pressing operation on until the end plates are seated against the rivet shoulders and thus control the widths of faces of the pulleys by the length of the rivets.

The rivet heads may be spread in any suitable manner but I have shown a convenient means of splitting them by annular ribs 10 carried by the press, so that the rivet heads may be spread sufficiently to hold the assembly together while it is green, that is, before it has been dried.

Upon upward movement of the upper portion of the press, the arbor 9 is removed from the assembly by any suitable mechanism (not shown) and the pulley is then taken from the press and dried in a suitable drier. During the drying operation the fibrous laminæ set permanently, so that they do not have a tendency to expand back into their original position. The pulley may, therefore, be loose between the end plates and, if so, it is placed again in a press and the rivets fully headed over to tightly hold the end plates and the permanently set pulley sections together and to take up any looseness that may be caused by the shrinkage of the fibrous laminæ, or by failure to first press the end plates against the rivet shoulders.

The center hole 12 of the pulley is then bored and the peripheries of the fibrous sections are trimmed, by turning them down or in any other suitable manner, to form a substantially cylindrical pulley, it being optional whether the pulley be formed truly cylindrical or be provided with a crowned surface (not shown) such as is common in this art. This process may be carried out in any suitable machine, as the fibrous material is easily removed with a cutting tool. The key seat 13, if not previously formed in the laminæ, is then formed in the fibrous and metal laminæ adjacent the center bore, and suitable radial apertures 14 are drilled through a rivet and tapped to receive set screws 15 to engage a key on a power shaft so that the pulley will turn therewith. The ends of the pulley may be painted and the fibrous material may be treated or coated as desired.

In case it is not desired or deemed necessary to use an adhesive binder between the layers of fibrous material, the step of drying may be omitted and the pulley pressed and heads fully riveted in the first operation in the press.

It is of course obvious that some of the rivets may be attached to each end plate before the rivets are put into the rivet apertures of the assembly. Thus, for example, each of the end plates may be previously secured to two rivets and seated firmly against the rivet shoulders with the heads of the rivets spread and one end plate may be applied to each end of the assembly and pressed as indicated above.

It will thus be seen that by interposing the relatively hard or metal plates 2 of less radial dimension at regular intervals between the fibrous laminæ and by pressing the central portion of the pulley so that the metal plates are substantially countersunk in the fibrous material, I have produced a laminated pulley which is considerably more dense at the inner portion so that it has a maximum mechanical strength for engagement with a shaft, and also I have obtained an outer portion which is relatively soft and has a maximum frictional surface for engagement with a belt or other power transmitting device.

Furthermore, it is to be understod that the particular forms of apparatus shown and described, and the particular procedure set forth, are presented for purposes of explanation and illustration and that various modifications of said apparatus and procedure can be made without departing from my invention as defined in the appended claims.

What I claim is:

1. The process of making pulleys which comprises forming a plurality of apertured laminæ of relatively soft material and a plurality of similarly apertured metal plates, interposing the plates between said laminæ, assembling said laminæ and plates substantially concentrically with apertures alined, passing rivets through certain of said apertures in each of said plates, and subsequently compressing the central portions of said assembly, so that the density of the fibrous material between the metal plates is substantially increased, and riveting them together through said central portions, whereby a pulley having a relatively dense interior and a relatively soft exterior is produced.

2. The process of making pulleys which comprises forming a plurality of laminæ of relatively soft material provided with centrally disposed apertures and other apertures symmetrically disposed around them, and forming a plurality of similarly apertured metal plates, interposing the plates between said laminæ, assembling the plates and laminæ substantially concentrically with the apertures alined, passing rivets through said alined apertures, compressing said assembly to substantially increase the density of the inner portion of the fibrous material, and spreading the ends of said rivets while said assembly is under pressure to permanently secure the assembly together.

3. The process of making pulleys which comprises forming a plurality of apertured laminæ of relatively soft material and a plurality of similarly apertured metal plates, interposing the plates between said laminæ, assembling the plates and laminæ substantially concentrically, applying end plates and passing shouldered rivets into said assemblies, pressing said end plates toward each other until they seat on the shoulders of said rivets, then immediately spreading the ends of said rivets, and finally trimming the outer surface of the pulley to the desired contour.

4. The process of making pulleys which comprises forming a plurality of laminæ of relatively soft material with centrally disposed apertures and a plurality of apertures symmetrically disposed around them, forming a plurality of similarly apertured metal plates, interposing the plates between said laminæ, assembling the plates and laminæ substantially concentrically with the apertures alined, passing rivets into said alined apertures and applying end plates, compressing said assembly to substantially increase the density of the inner portion of the fibrous material and to permanently set the outer portions thereof, and spreading the ends of said rivets while said assembly is under compression to permanently secure the assembly in compressed condition.

5. The process of making pulleys which comprises forming a plurality of laminæ of relatively soft fibrous material with pairs of apertures symmetrically arranged therein, assembling them in a stack, securing a pair of rivets to each of a pair of end plates, passing the free ends of each pair of rivets through said apertures from opposite ends of the assembled laminæ, compressing the assembly, and spreading the rivet ends.

In testimony whereof, I hereunto affix my signature.

WILLIAM T. HENSLEY.